Figure 1:
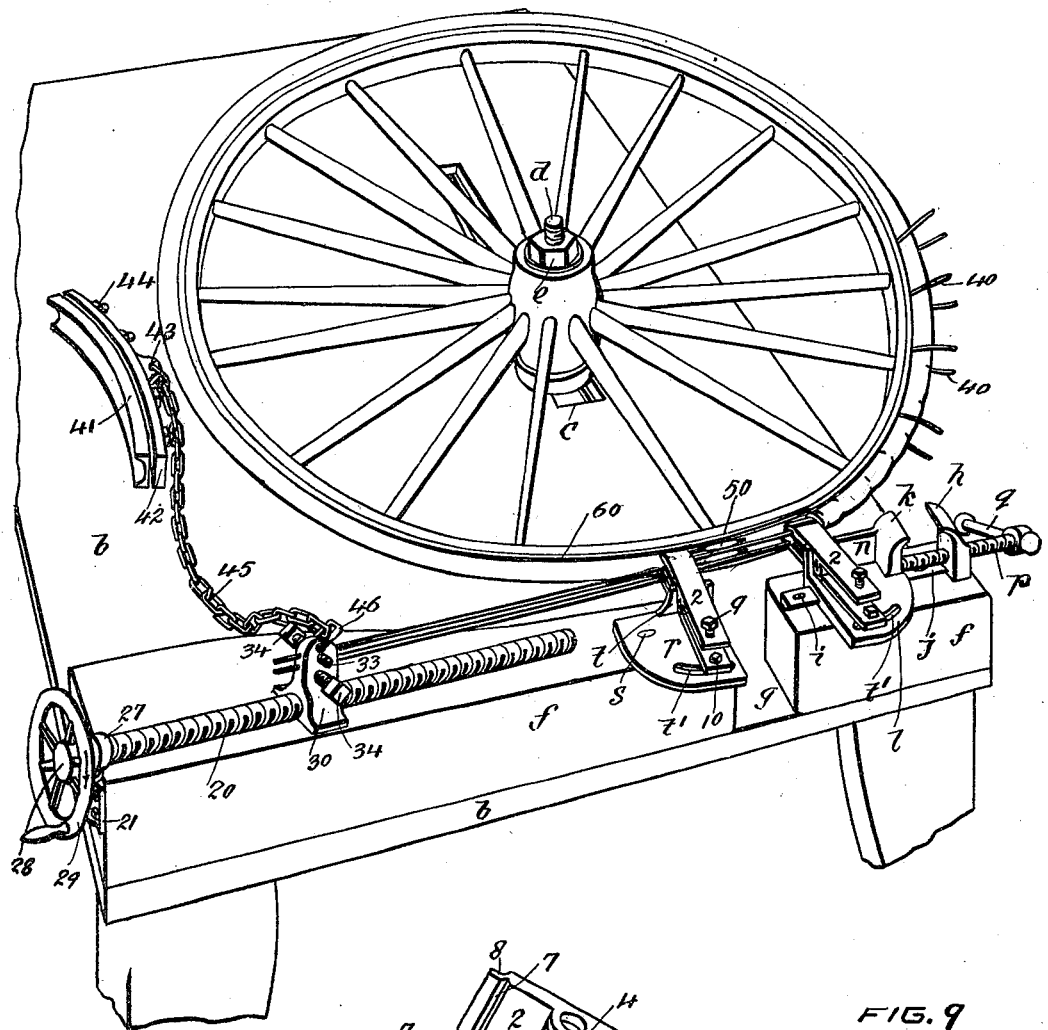

No. 683,943. Patented Oct. 8, 1901.
W. JENNINGS.
TIRE ATTACHING MECHANISM.
(Application filed Oct. 11, 1900.)

(No Model.) 4 Sheets—Sheet 1.

WILLIAM JENNINGS, Inventor

No. 683,943. Patented Oct. 8, 1901.
W. JENNINGS.
TIRE ATTACHING MECHANISM.
(Application filed Oct. 11, 1900.)

(No Model.) 4 Sheets—Sheet 2.

Witnesses

WILLIAM JENNINGS
Inventor
By his Attorney

No. 683,943. Patented Oct. 8, 1901.
W. JENNINGS.
TIRE ATTACHING MECHANISM.
(Application filed Oct. 11, 1900.)

(No Model.) 4 Sheets—Sheet 3.

WILLIAM JENNINGS
Inventor
By his Attorney

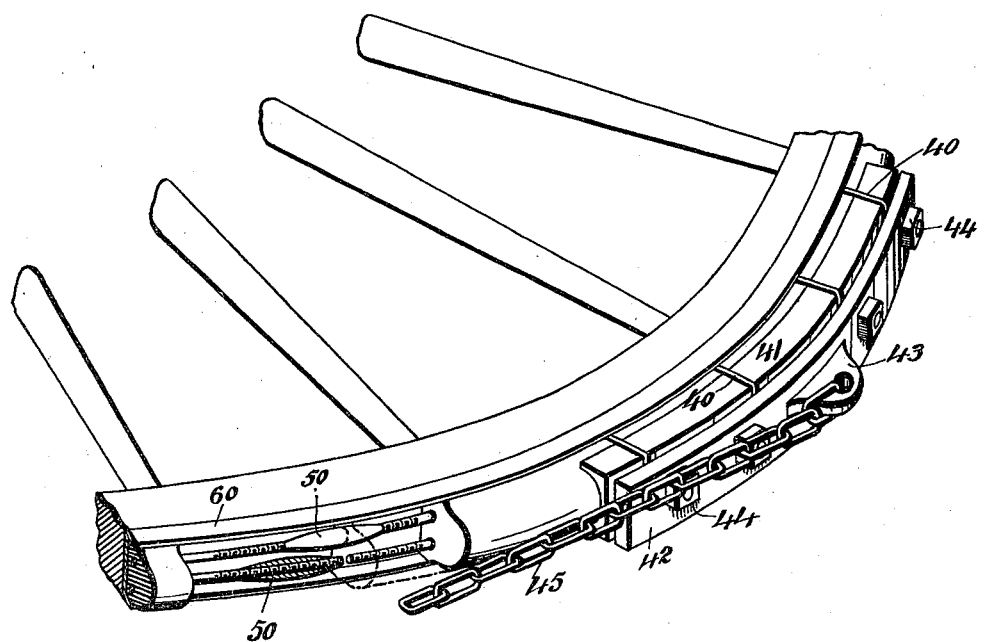

UNITED STATES PATENT OFFICE.

WILLIAM JENNINGS, OF MONTREAL, CANADA.

TIRE-ATTACHING MECHANISM.

SPECIFICATION forming part of Letters Patent No. 683,943, dated October 8, 1901.

Application filed October 11, 1900. Serial No. 32,750. (No model.)

*To all whom it may concern:*

Be it known that I, WILLIAM JENNINGS, of the city of Montreal, in the district of Montreal and Province of Quebec, Canada, have invented certain new and useful Improvements in Tire-Attaching Mechanism; and I do hereby declare that the following is a full, clear, and exact description of the same.

My invention relates particularly to the attachment of solid-rubber tires to the wheels of carriages, wagons, and like conveyances; and it has for its object to provide mechanism that will in itself comprise means for retracting the rubber tire to temporarily strip the metallic length by which it is secured to the rim of the wheel, retaining the rubber away from the ends of said metallic length and firmly holding the said ends of the metallic length while they are being formed to connect with one another, and finally stretching the rubber tire again over the ends after they have been joined, all without removing the wheel from its supporting means.

To this end the invention may be said briefly to consist of a table having a vertical trunnion adjustable toward and from the front side of said table, a pair of rigidly-mounted gripping devices, transversely through each of which one end of the tire-retaining metallic length is passed after having been inserted in and extending throughout the length of the rubber tire, means for causing one of said gripping devices to grip one end of said metallic length, a drawing device located adjacent to that side of the other gripping device through which the other end of the metallic length projects, means for connecting said last-mentioned end of the metallic length to said drawing device in order that upon the operation of said drawing device the said metallic length will be drawn through its gripping device, while the rubber tire will abut against it and be contracted, thus stripping a portion of said end, and this gripping device is then caused to grip the metallic length, passing therethrough, which is cut off at the required length. The two ends projecting from the pair of gripping devices are then formed for jointing, and after having been jointed a clamping device is clamped upon the rubber and connected to the drawing device, the operation of which will then stretch the rubber tire and reëstablish its former condition, thereby covering up the joints.

I will hereinafter describe in detail and illustrate my invention as applied to the connection of a rubber tire to a carriage-wheel by metallic lengths in the form of wires the ends of each of which are jointed by a nut screwed completely upon one length first and after the ends have been made to abut screwed half off of such end and half upon the other end, each end being correspondingly screw-threaded and held in abutting relation by the gripping devices while the nut or retaining-sleeve (which is of novel construction) is being screwed from one to the other. For full comprehension, however, of my invention reference must be had to the accompanying drawings, forming a part of this specification, in which similar reference characters indicate the same parts, and wherein—

Figure 2:
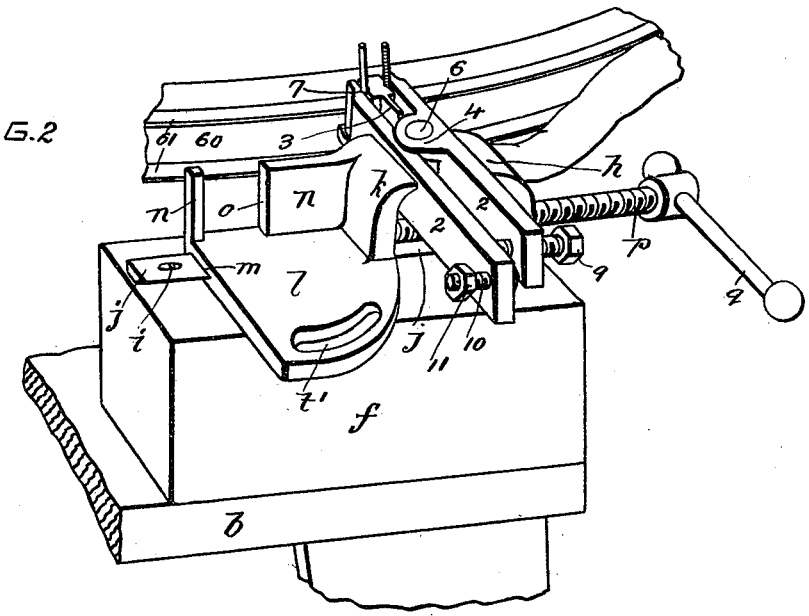
Figure 3:
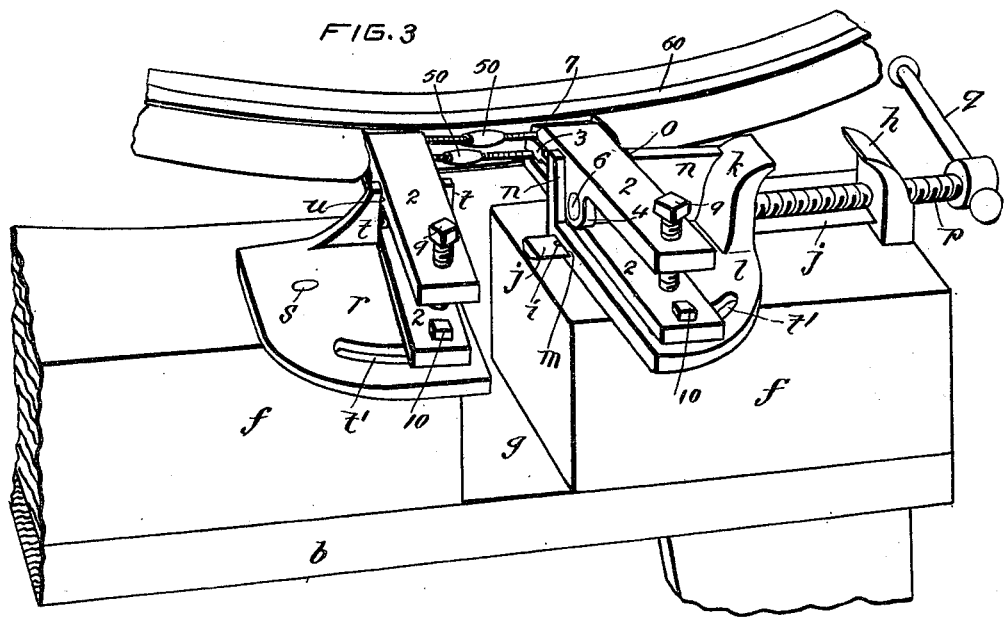
Figure 4:
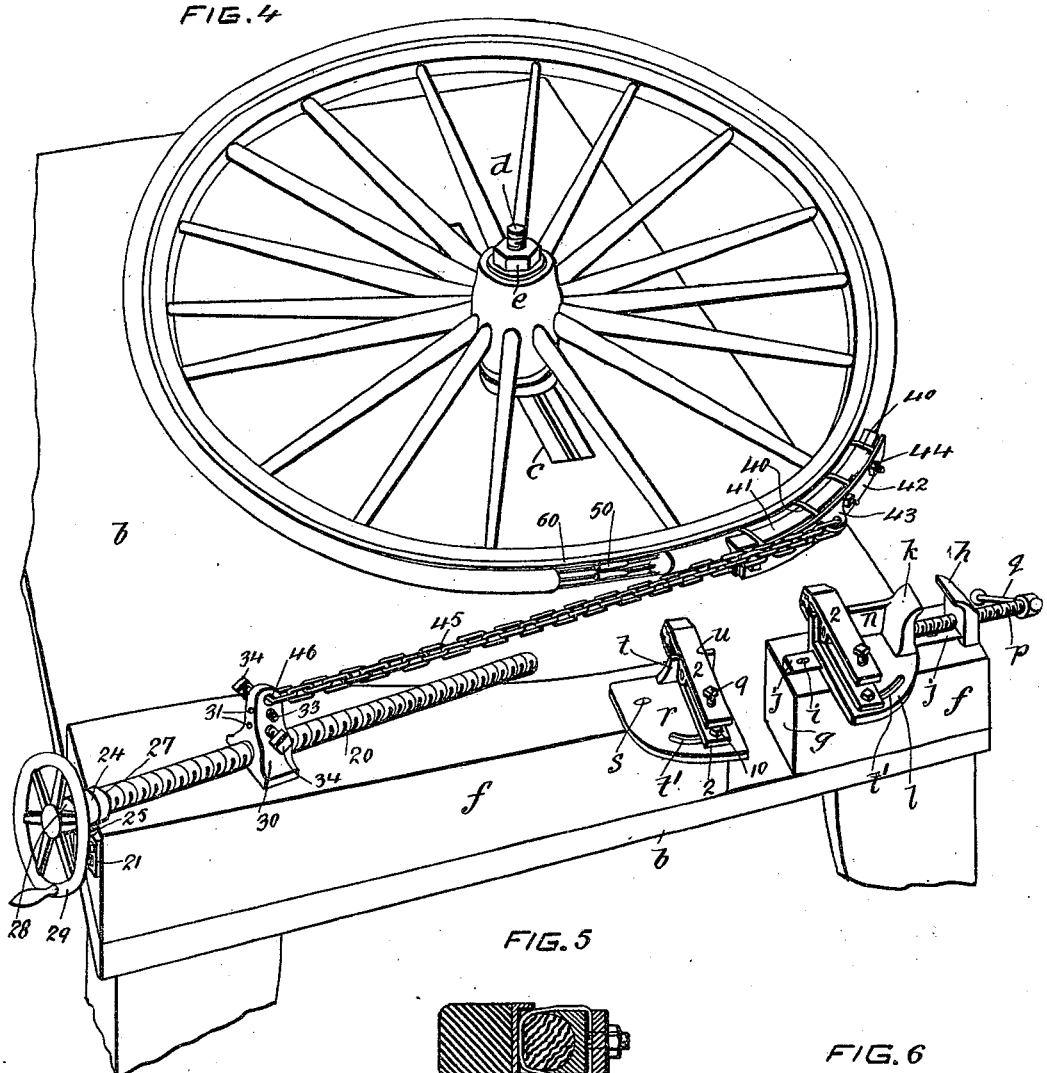
Figure 5:
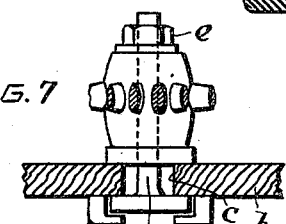
Figure 7:
Figure 6:
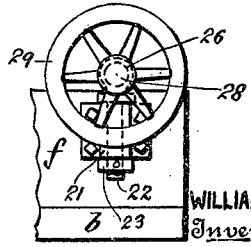

Figure 1 is a perspective view of my improved tire-attaching mechanism, illustrating the parts in their relative positions after the drawing device has drawn the wires through one of the gripping devices. Fig. 2 is an enlarged perspective view illustrating one of the gripping devices after it has been caused to grip the wire drawn therethrough, said gripping device being held in a position convenient to have the ends of the wires held thereby screw-threaded. Fig. 3 is a similar view to Fig. 2, but illustrating the parts in their relative positions, with the ends of the wires in abutting relation; Fig. 4, a similar view to Fig. 1, but with the parts in their relative positions for reëstablishing the normal condition of the rubber tire. Fig. 5 is a detail transverse sectional view of my improved tire-clamping device. Fig. 6 is a detail view of the bracket for pivotally connecting the spindle of the drawing device to the end of the table. Fig. 7 is a detail transverse sectional view of the table, illustrating particularly the wheel-carrying slide. Fig. 8 is a detail perspective view of one of my improved grippers with its parts disjointed. Fig. 9 is an enlarged detail sectional view of the sliding block of the drawing device, taken transversely of the actuating-spindle; and Fig. 10 is an enlarged perspective view illustrating the tire in the act of being drawn over the joint, the dotted lines showing how the rubber stretches over the prolate spheroidal sleeve, thereby plugging up the wire-perforation and preventing leakage to the joint.

The table $b$ is and may be of ordinary construction and is slotted about the middle thereof and from front to rear, as at $c$. A trunnion $d$ is adjustable along the slot and may be secured at any desired point therealong by a nut $e$. The front side of the table is raised by an oblong block $f$, divided, as at $g$, in line with the slot $c$ in the table. A fixed upwardly-projecting jaw $h$ is secured to the top of the block to the right of the opening $g$ by screws $i$, taking through a flat bar $j$, cast in one with said jaw and constituting a rail upon which a movable jaw $k$ travels. This movable jaw is cast in one with a plate $l$, having a dovetail groove $m$ longitudinally of the under side thereof to take over said rail $j$, the sides of which are beveled correspondingly. A web $n$, with an opening $o$, is cast in one with the side of said plate adjacent to the wheel, and a screw $p$ for moving said plate, and with it the jaw carried thereby, takes through a tapped boring in the fixed jaw and is rotatably connected at one end to the said movable jaw and carries the usual sliding handle-bar $q$ at its other end.

Cramping mechanism is located with a part thereof on each side of the opening $g$ in the table-block and consists of a pair of grippers, carried one by the movable plate just described and the other by a plate $r$, secured rigidly by bolts $s$ to the top of the table-block to the left of the opening $g$. This plate $r$, like the plate $l$, is formed with a web $t$, having an opening $u$, and each plate overlaps the outer side edge of the table-block and has a quadrantal groove $t'$, concentric of the center of the openings $o$ and $u$ in their webs, these openings receiving the grippers, which are adjustable over the quadrantal slots to different angular positions relatively to the webs. Each gripper consists of a pair of adjustable jaws 2 and an idle jaw 3. The adjustable jaws are each formed with a pair of hinge-lugs 4 and the idle jaw with a hinge-lug 5, all of said lugs registering with and being pivotally connected to one another by a pintle 6. The contact-faces of these jaws are formed with registering transverse angular grooves 7 close to the ends thereof, and the ends of the outside faces thereof are beveled, as at 8, while the tail of the upper adjustable jaw 2 has a clamping-bolt 9 projecting downwardly therethrough and bearing upon the tail of the lower adjustable jaw to enable said tails to be adjusted apart and the jaws thereof consequently to be clamped upon the idle jaw. The tail of the lower jaw of each gripper lies over the quadrantal slot in each of the plates $o$ and $u$, and a bolt 10 projects downwardly through the tail and through the slot extending beneath it and receives a nut 11, by means of which each gripper can be set in the necessary angular position relatively to the web of its plate. The ends of the wires for securing the rubber tire upon the wheel-rim are passed between the jaws of the respective grippers, the gripper on the left being caused to grip the ends therethrough and the gripper on the right being caused to close over the ends therethrough without quite gripping them, as will be clearly shown in the description of the operation.

The device for drawing the wires to tighten the tire upon the rim of the wheel consists of a screw-threaded spindle 20, rotatably mounted in an oscillatory bracket, comprising a vertical bearing 21, bolted to the end of the table-block $f$, and a spindle 22, taking through said bearing and located therein by a rigid collar 23 upon its lower end, and a head 24, forming a shoulder 25, to rest upon the top of the bearing. A boring 26 through this head receives the outer end of the spindle 20, which is rotatably held therein by a rigid collar 27, and the hub 28 of a hand-wheel 29, mounted rigidly upon the extreme end of said spindle. A sliding block 30 rests upon the table-block $f$ and has a tapped boring to take over the screw-threaded spindle and be moved therealong by the rotation thereof. A pair of passages 31 are formed in this sliding block longitudinally of the actuating-spindle, and each is intersected by a tapped boring 32, in one end of which a screw-threaded plug 33 is inserted to the passage, the inner end thereof being concaved, while a screw-bolt 34 takes into the other end and has its inner end convexed, thus providing means for pinching and rigidly retaining the end portion of the wires to be drawn.

After the tire has been fastened upon the wheel the tire clamping and extending device is connected to the tire and operated to stretch it over the joint. This tire clamping and stretching device consists of a series of short wire lengths 40 of U form placed upon the rim before the tire is placed upon it and a curved clamping-bar 41, having a longitudinal concavity to fit upon the tire, a capping-plate 42, having a perforated lug 43, being connected to the outside face of this bar by screw-bolts 44, while a chain 45 connects the lug 43 to the sliding block, as at 46, of the drawing device.

The wires for attaching the tire are each screw-threaded before being run through the tire, and the opposite ends thereof are correspondingly screw-threaded after having been temporarily stripped and cut the proper length, as will be shown in the description of the operation, and an interiorly-screw-threaded connecting-sleeve 50 is screwed completely upon one end of each wire and carried thereby until the ends of each wire are to be joined. These sleeves 50 are each of prolate spheroidal form.

The metal rim 60 is and may be of the form well known to carriage manufacturers and has a pair of peripheral flanges 61 on the edges of its perimeter.

The operation of attaching a tire by my improved mechanism is as follows: The wheel is first placed upon the trunnion and moved with the trunnion-slide into close proximity to the cramping device, the grippers being then adjusted into radial line with the wheel-hub and set rigidly in such position, while one and the corresponding end of each wire is firmly gripped by the left gripper and the opposite ends thereof are threaded through the grooves in the right gripper and through the passages in the sliding block of the drawing device, in which latter they are rigidly held, the jaws of the right gripper remaining loose. The hand-wheel of the drawing device is then turned in the direction indicated in Fig. 1, thereby causing the sliding block to travel toward the left of the machine, and when the tire is tightened upon the rim the gripper on the right is caused to grip the wires, and said wires are then cut the required length to abut the ends held by the gripper on the left. The vise-screw is then slackened slightly and the gripper on the right, with the wire ends held thereby, is released and lifted from its plate and placed in the vise, (see Fig. 2,) where it is rigidly held while the said wire ends are screw-threaded correspondingly to the opposite ends, which, as before mentioned, were screw-threaded before having been run through the tire. After this screw-threading operation the vise is opened and the gripper taken therefrom, placed in the opening in the web of its plate, and set rigidly upon said plate. The vise-screw is then turned to move the plate, and with it the gripper, until the screw-threaded ends of each wire abut, after which the sleeves 50 are screwed from the ends carrying them, half upon the ends last screw-threaded. (See Fig. 3.) The wheel is moved back from the front of the table and the grippers are then released from the wire lengths and the tire-clamping device clamped upon the retracted portion of the tire. The hand-wheel is then again turned as before, thereby reëstablishing the normal condition of the tire and causing the ends thereof to abut and the joints to be completely incased therein, the prolate spheroidal form of the connecting-sleeves 50 enabling this to be done, the ends of the tire being coated with cement before they are caused to abut to make the completed tire intact. The screws of the tire-clamping device are then loosened, the clamp and its wires and the wheel removed, and the latter is ready for use.

I do not herein claim specifically the prolate spheroidal sleeve for connecting the screw-threaded ends of each wire together, as it forms the subject-matter of an application forming a divisional part hereof, filed on the 12th of October, 1900, under Serial No. 32,815.

What I claim is as follows:

1. In tire-attaching mechanism the combination with a stationary gripper, a removable gripper located adjacent to said stationary gripper, and means for moving said removable gripper toward and from said stationary gripper, of a pair of clamping-jaws adapted to receive said removable gripper between them and located adjacent to the side of said removable gripper opposite to that adjacent to which said stationary gripper is located, substantially as described and for the purpose set forth.

2. In tire-attaching mechanism the combination with a wheel-supporting table of a cramping device consisting of a stationary gripper; a movable carrier adjacent to said stationary gripper; a gripper removably carried by said movable carrier; a clamping-jaw integral with said movable carrier; a clamping-jaw rigidly upon the table in position to coincide with the jaw upon the movable carrier; and means for moving said carrier toward and from said stationary gripper; substantially as and for the purpose set forth.

3. In tire-attaching mechanism the combination with a wheel-supporting table of a cramping device consisting of a stationary plate, a gripper carried by said plate; a movable plate having a pair of projections at right angles thereto; a gripper resting removably between the said projections of said movable plate; means for connecting said last-mentioned gripper to said movable plate; a jaw integral with one side edge of said movable plate; a jaw rigidly upon the table in position to coincide with said jaw upon the plate; means for moving said movable plate toward and from said stationary plate, substantially as described and for the purpose set forth.

4. In tire-attaching mechanism the combination with a wheel-supporting table of a cramping device consisting of a stationary plate, a gripper carried by said plate; means for adjustably connecting said gripper to said plate; a movable plate having a pair of projections at right angles to said plate; a gripper resting removably between the said projections of said movable plate; means for adjustably connecting said last-mentioned gripper to said movable plate; a jaw integral with one side edge of said movable plate; a jaw rigidly upon the table in position to coincide with said jaw upon the plate; a screw threaded through said jaw upon the table and rotatably connected at its inner end to said jaw upon the plate for moving said movable plate toward and from said stationary plate, substantially as described and for the purpose set forth.

5. In tire-attaching mechanism the combination with a table, of a movable plate with a quadrantal slot near its forward side, and a dovetailed groove in the under side thereof; a vertical web upon said movable plate at the rear edge thereof and having an opening therein; a jaw rigidly upon said plate near one side thereof; a gripper resting removably in said opening in the web and extending over said quadrantal slot; means projecting through said slot for connecting said gripper to said plate; a dovetailed rail secured rigidly upon said table and upon which said plate moves; a stationary jaw coacting with said first-mentioned jaw and integral with said rail and having a tapped boring therethrough; a screw taking through said tapped boring; means for rotatably connecting one end of said screw to said plate; and means for turning said screw, substantially as described and for the purpose set forth.

6. In tire-attaching mechanism the combination with a table, of a drawing device for the purpose set forth, comprising a screw-threaded spindle; a hand-wheel rigidly carried upon one end of said spindle; means for pivotally connecting said spindle to said table to swing parallel to the surface thereof; a traveling block having a tapped boring to take upon said screw-threaded spindle, a pair of passages longitudinally of said spindle, and a pair of tapped borings intersecting said passages; a pair of screw-plugs taking into opposite ends of said last-mentioned borings; and a pair of pinching-screws taking into the other ends of said last-mentioned borings, substantially as described.

7. In combination with a drawing device, of a tire-clamping device consisting of a curved bar having a longitudinal concavity in its inside; a plate extending from end to end of the outside of said bar; a series of screw-bolts detachably connecting said plate to said bar; a series of wire lengths of U form having their ends inserted between said plate and bar; and means for connecting said clamping device to said drawing device substantially as described and for the purpose set forth.

In testimony whereof I have affixed my signature in presence of two witnesses.

WILLIAM JENNINGS.

Witnesses:
　WILLIAM P. MCFEAT,
　FRED. J. SEARS.